C. COESTER, Jr., & J. L. MOORE.

Assignors, by mesne Assignments, to F. ARMSTRONG.

Garter.

No. 8,146 Reissued March 26, 1878.

Witnesses:

John Tyler

Arthur L. McIntire

Inventors

Charles Coester jr.

James L. Moore

By Attorney.

Wm. C. Wurdeman

UNITED STATES PATENT OFFICE.

CHARLES COESTER, JR., AND JAMES L. MOORE, OF BRIDGEPORT, CONNECTICUT, ASSIGNORS, BY MESNE ASSIGNMENTS, TO FRANK ARMSTRONG, OF SAME PLACE.

IMPROVEMENT IN GARTERS.

Specification forming part of Letters Patent No. 106,328, dated August 16, 1870; Reissue No. 8,146, dated March 26, 1878; application filed January 23, 1878.

*To all whom it may concern:*

Be it known that we, CHARLES COESTER, Jr., and JAMES L. MOORE, of Bridgeport, in the county of Fairfield and State of Connecticut, have invented certain Improvements in Garters and other elastic bands, of which the following is a specification:

This invention relates to a new article adapted to take the place of the ordinary elastic now used for garters to hold the stocking, and as armlets to hold in place the shirt or other sleeves on the person of the wearer; and consists in making elastic bands (adapted to such purposes) of wire or a strip of metal coiled into a spring, which may be either circular, elliptical, or of a flattened form in cross-section, and with its ends united or adapted to be clasped together, as hereinafter more fully described.

Figure 1:
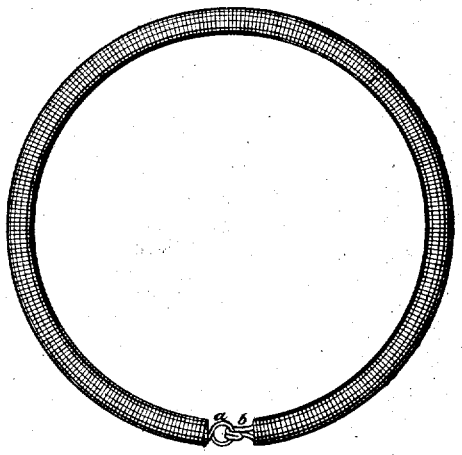
Figure 2:
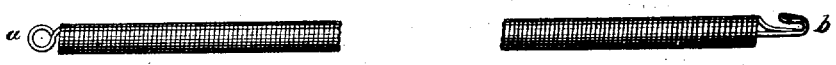

In the accompanying drawing, Figure 1 is a view of an elastic band or garter formed of a helically-wound wire, and having its ends clasped together. Fig. 2 is a view of the same unclasped and in a distended condition.

The band illustrated in the drawing is made by coiling a wire of brass or other metal having sufficient elasticity into the form of a helical spring, and so bending up the ends as to form of one an eye, *a*, and of the other a hook, *b*, as shown.

The extreme ends of the wire, after the hook and eye have been formed, may be soldered to strengthen hook and eye and permanently secure the ends in place.

In the manufacture of this kind of elastic bands they should be made of different sizes, and in their use the band selected should be somewhat shorter than the circumference of the leg or arm to which it is to be applied, so that it will clasp the stocking or sleeve tightly enough to hold it on the person perfectly.

Instead of the band being constructed as shown in the drawing, it may be so formed as to present an elliptical or flattened shape in cross-section, and in lieu of having its ends bent into hook-and-eye form, as shown, it may have attached to its ends a fastening device of different construction. The ends of the coil may, however, be perfectly united or connected, in which case the band has to be stretched over the foot or hand, as the case requires, in the same manner as in the use of a band formed of elastic with its ends sewed together.

It will be understood that bands adapted to be used for the purposes mentioned, when made of metal springs according to this invention, will retain their elasticity much longer than those now generally used for garters and sleeve-elastics, and it will be seen that this invention is subject to various modifications without losing its main advantages.

Having sufficiently described the invention to enable one skilled to make and understand the use of the improved elastic metallic bands, what is claimed as a new article, and desired to be secured by Letters Patent, is—

1. An uncovered longitudinally elastic metallic spring garter or sleeve elastic, as hereinbefore set forth.

2. A metallic spring band longitudinally elastic, having a clasping device formed of the bent ends of the band, substantially as described.

CHAS. COESTER, JR.
JAMES L. MOORE.

Witnesses:
THEODORE COURTRIGHT,
WILLIAM O'MALLEY,
J. H. OSGOOD,
CHARLES R. GOULD.